(12) United States Patent
Wilson et al.

(10) Patent No.: US 12,546,417 B2
(45) Date of Patent: Feb. 10, 2026

(54) GARDEN FLUID FLOW CONNECTORS

(71) Applicant: EXEL Industries, Epernay (FR)

(72) Inventors: Jack Wilson, Birmingham (GB); Robert Boughton, Birmingham (GB)

(73) Assignee: EXEL Industries, Epernay (FR)

( * ) Notice: Subject to any disclaimer, the term of this patent is extended or adjusted under 35 U.S.C. 154(b) by 0 days.

(21) Appl. No.: 18/765,161

(22) Filed: Jul. 5, 2024

(65) Prior Publication Data
US 2025/0012387 A1 Jan. 9, 2025

(30) Foreign Application Priority Data
Jul. 7, 2023 (GB) .................................... 2310494

(51) Int. Cl.
*F16L 33/22* (2006.01)
*F16L 21/08* (2006.01)
*F16L 33/28* (2006.01)

(52) U.S. Cl.
CPC ............... *F16L 21/08* (2013.01); *F16L 33/28* (2013.01)

(58) Field of Classification Search
CPC ....... F16L 33/28; F16L 33/225; F16L 33/035; F16L 37/10; F16L 37/101; F16L 37/107; F16L 37/24; F16L 37/244; F16L 37/248; F16L 37/252
See application file for complete search history.

(56) References Cited

U.S. PATENT DOCUMENTS

| | | | |
|---|---|---|---|
| 3,649,052 A * | 3/1972 | Snyder, Jr. | .......... F16L 27/0816 285/38 |
| 5,318,332 A | 6/1994 | Hohmann | |
| 7,021,669 B1 | 4/2006 | Lindermeir et al. | |
| 7,095,069 B2 | 8/2006 | Cha | |
| 7,543,858 B1 | 6/2009 | Wang | |

(Continued)

FOREIGN PATENT DOCUMENTS

| | | |
|---|---|---|
| AU | 2013100204 A2 | 2/2013 |
| AU | 2020201103 A1 | 2/2020 |

(Continued)

OTHER PUBLICATIONS

U.K. Intellectual Property Office, Search Report for Application No. 2310494.6, Jan. 23, 2024.

(Continued)

*Primary Examiner* — Aaron M Dunwoody
(74) *Attorney, Agent, or Firm* — Nixon & Vanderhye, PC

(57) ABSTRACT

A garden fluid flow connector arrangement including a first connector portion and a second connector portion which is arranged to inter-engage with the first connector portion to form a fluid path through the connector arrangement. The first connector portion includes a first body portion and a locking portion mounted on the first body portion for rotation about an axis of the first body portion and the second connector portion includes a second body portion carrying an engaging portion. The locking portion is rotatable relative to the first body portion and the engaging portion between a first position in which the first and second connector portions are engaged and held against axial separation by interaction of the locking portion and the engaging portion and a second position for allowing axial separation of the first and second connector portions.

23 Claims, 10 Drawing Sheets

(56) References Cited

U.S. PATENT DOCUMENTS

| | | | |
|---|---|---|---|
| 8,985,641 | B1 | 3/2015 | Barcatta |
| 9,664,322 | B2 | 5/2017 | Lehmann |
| 2009/0236851 | A1* | 9/2009 | Hampel ............... F16L 37/244 |
| | | | 285/403 |
| 2012/0319401 | A1 | 12/2012 | Wang |
| 2014/0284915 | A1 | 9/2014 | Arnold et al. |
| 2019/0285216 | A1 | 9/2019 | Lo |
| 2020/0326021 | A1 | 10/2020 | Chen |
| 2022/0364667 | A1 | 11/2022 | Jensen |
| 2023/0132466 | A1 | 5/2023 | Guo |

FOREIGN PATENT DOCUMENTS

| | | |
|---|---|---|
| CN | 206669142 U | 11/2017 |
| CN | 209845874 U | 12/2019 |
| CN | 210600596 U | 5/2020 |
| CN | 218564695 U | 3/2023 |
| DE | 202006019127 U1 | 12/2006 |
| EP | 1816385 A2 | 1/2007 |
| EP | 2937616 A1 | 4/2015 |
| EP | 3543579 A1 | 3/2018 |
| KR | 20140148119 A | 12/2014 |
| WO | 0060269 A1 | 10/2000 |
| WO | 2020229716 A2 | 11/2020 |

OTHER PUBLICATIONS pipestock.com, Camlock, https://www.youtube.com/watch?v=za3jpNvOQD8 and https://www.pipestock.com/polypropylene/pp-camlock-fittings (accessed Feb. 2023).

camco.net, Bayonet, https://www.camco.net/sewer-fittings/revolution-bayonet-fitting-bayonet-fitting-39481 and https://www.etrailer.com/tv-review-camco-revolution-rv-sewer-hose-extenstion-cam39623.aspx (accessed Feb. 2023).

tameson.co.uk, Storez-Type Coupling, A Guide to Storz Couplings | Tameson.co.uk, https://tameson.co.uk/pages/storz-couplings (accessed 2023).

geka.de, Geka Twist Lock, https://www.geka.de/en/fittings-guide (accessed 2023).

GB Search Report for Application No. GB2408748.8 dated Nov. 21, 2024. (2 pages).

Extended European Search Report for Application No. 24186824 dated Nov. 12, 2024, 9 pages.

* cited by examiner

GARDEN FLUID FLOW CONNECTORS

This application claims priority to GB Patent Application No. 2408748.8 filed Jun. 18, 2024, and GB Patent Application No. 2310494.6 filed Jul. 7, 2023, the entire contents of each of which are hereby incorporated by reference.

This invention relates to garden fluid flow connectors, such as hose fittings which are used to connect a hose to a garden tap, or a hose to another garden product or indeed a hose to another length of hose.

There are different types of garden fluid flow connectors which are commonly used. One popular type is a push fit form of connector system where there is a male part and a female part arranged so that the male part may be push fitted into the female part and be retained for normal use until released.

One system which is widely used in Europe and elsewhere is the "quick-connect" connection system. Different manufacturers make such connector systems which sometimes are constructed differently from one another but to large degree are interchangeably usable. The two parts of the connector system are typically made of plastics material or a combination of metal and plastics material parts.

Such push fit connection systems are particularly convenient for a user, but can have an issue of accidental separation of the two parts—ie accidental disconnection of connected components-say accidental disconnection of a hose from a tap.

Thus it would be desirable to develop alternative garden fluid flow connectors which aim to address this issue.

According to one aspect of the present invention, there is provided, a garden fluid flow connector arrangement comprising a first connector portion and a second connector portion which is arranged to inter-engage with the first connector portion to form a fluid path through the connector arrangement, wherein the first connector portion comprises a first body portion and a locking portion mounted on the first body portion for rotation about an axis of the first body portion and the second connector portion comprises a second body portion carrying an engaging portion and wherein the locking portion is rotatable relative to the first body portion and the engaging portion between a first position in which the first and second connector portions are engaged and held against axial separation by interaction of the locking portion and the engaging portion and a second position for allowing axial separation of the first and second connector portions.

This arrangement can help guard against accidental or unwanted separation of the two parts of the connector arrangement. The arrangement can provide the user with a simple and intuitive "twist-lock" function when putting the connector portions together. Such a locking system can also be simply manufactured and robust.

In addition to the above locking portion and the engaging portion, the connector arrangement may comprise a further connection mechanism for connecting the connector portions together.

The connector arrangement may comprise a push fit connection mechanism for connecting the first and second connector portions. The push fit connection mechanism may comprise an industry standard hose fitting connection mechanism, such as a system known as a "quick-connect" connection system.

In a quick-connect connection system, one part is a male part and carries at least one O-ring seal, the other part is female and includes a bore arranged to accept the male part with the O-ring seal sealing against a wall of the bore. The female part further comprises a plurality of engaging fingers arranged to move resiliently between an extended position for capturing the male part and a retracted position allowing insertion and removal of the male part in the receiving bore. As the male part is introduced into the receiving bore the engaging fingers are driven into the retracted position and return to the extended position once the two parts are fully engaged. A release mechanism is provided for releasing the two parts. When operated this retracts the engaging fingers so that the male part may be removed.

In use sometimes the release mechanism may be accidentally operated. On other occasions, the retaining effect of the engaging fingers might be overcome simply by the two parts of the connection system being forcibly pulled apart. Furthermore, as the connection system wears, the effectiveness of the retaining effect may be reduced.

In such cases the present locking portion and engaging portion can act to enhance the connection between the first and second connector portions by increasing resistance to unwanted axial separation of the first and second connector portions.

In other situations the present type of connector arrangement may be used without the presence of a quick-connect connection system or other additional connection mechanism.

In one set of embodiments the engaging portion is moulded as part of the second body portion. In this case the engaging portion is carried in the sense of being part of the second body portion.

In another set of embodiments the engaging portion is separate from but mounted on the second body portion. In such case, the engaging portion may be say fixedly mounted or rotatable mounted on the second body portion.

The locking portion and engaging portion may be arranged to latch into the first position such that movement out of the first position towards the second position is resisted.

One of the locking portion and the engaging portion may comprise a detent and the other of the locking portion and the engaging portion may comprise a camming surface over which the detent rides as the locking portion is moved into and out of the first position relative to the engaging portion.

The camming surface may have a shoulder portion against which the detent rides as the locking portion is moved out of the first position towards the second position.

The camming surface may be provided on a circumferential surface so that action of the camming surface causes the detent to move in a generally radial direction as the detent rides over the camming surface.

The locking portion and the engaging portion may comprise respective stop portions which abut one another and resist further rotational movement of the locking portion relative to the engaging portion when the locking portion is moved fully into the first position.

When the locking portion is in first position, the locking portion may locked against rotation relative to the engaging portion.

The rotatable mounting of the locking portion on the first body portion may be such that the first body portion is freely rotatable relative to the locking portion when the locking portion is in the first position with the first and second connector portions engaged with one another.

This in turn allows that a hose or other item mounted on the first body portion is able to rotate about the axis of the first body portion whilst the connector portions are engaged with one another and held against axial separation by the locking portion and the engaging portion. In turn this means that said hose or other item is able to rotate about the axis of the first body portion relative to the second body portion and any hose or other item mounted on the second body portion. Thus in such embodiments the connector arrangement allows relative rotation of items joined by the connector arrangement, which in turn can, for example, help reduce the risk of kinking or twisting of a hose that is connected to another item via the connector arrangement.

In a preferred set of embodiments the locking portion and engaging portion are latched together against relative rotation when the locking portion is in the first position whilst the first body portion is free to rotate relative to the second body portion when the locking portion is in the first position.

The locking portion may be ring shaped. The locking portion may be a locking collar. The locking portion may be a spinning locking collar. That is to say a locking collar that can rotate freely or spin relative to the first body portion.

In some alternatives the engaging portion may be arranged to rotate freely or spin relative to the second body portion.

In some alternatives the locking portion may be arranged to rotate freely or spin relative to the first body portion and the engaging portion may be arranged to rotate freely or spin relative to the second body portion.

The camming surface may comprise a ramp portion for guiding the detent as the locking portion is rotated towards the first position.

The camming surface may have an apex portion at an upper end of the ramp. The camming surface may comprise a recess portion on an opposite side of the apex portion than is the ramp portion. The detent may be disposed in the recess portion when the locking portion is in the first position.

In one set of embodiments, when the locking portion is in the first position, the detent may bear against the recess portion of the camming surface and a remaining portion of the locking portion may bear against at least one portion of the engaging portion outside of the recess portion. The apex portion may bear against a corresponding portion of the locking portion when the locking portion is in the first position.

In one set of embodiments, the locking portion may comprise at least one arm having, and say terminating in, a lip which is arranged to interact the engaging portion to resist axial separation of the first and second connector portions.

The locking portion may comprise a pair of arms each having, and say terminating in, a respective lip.

The engaging portion may comprise at least one flange portion is which is arranged to interact with the locking portion to resist axial separation of the first and second connector portions.

The engaging portion may comprise a pair of flange portions.

The at least one arm may be arranged to interact with the at least one flange portion.

The provision of at least one arm can assist a user in identifying the lock condition and the unlock condition of the locking portion. For example, it can be readily visible to a user that the unlock condition is reached because the arm or arms are not aligned with the operative parts of the engaging portion—eg the flange portions, whereas the lock position is obtain when these parts are aligned.

This can assist in connecting the components to one another and disconnecting the components from one another. In an alternative version of the locking portion a complete collar portion with no projecting arms has been considered with the operative parts for interacting with the engaging portion on the inside of the collar. This gives a neat appearance but makes it more difficult to identify the unlock and lock conditions.

One of the detent and the camming surface may be provided on the at least one arm and the other of the detent and the camming surface may be provided on the at least one flange portion.

In another set of embodiments the locking portion comprises a collar portion. This may have no projecting arms.

One of the detent and the camming surface may be provided on a circumferential side wall of the collar portion and the other of the detent and the camming surface may be provided on a circumferential surface of the engaging portion which surface faces the circumferential side wall of the collar portion.

The collar portion may comprise at least one projecting portion which is arranged to act as the detent. The projecting portion may project from a circumferential side wall of the collar portion. The projection portion may, for example, project radially inwardly from the collar portion.

In such cases the camming surface may be provided on a circumferential surface of the engaging portion which surface faces the circumferential side wall of the collar portion from which the projecting portion projects.

In a currently preferred set of embodiments, at least one of the second connector portion and the locking portion comprises guiding means for guiding the locking portion towards the first position as the connector portions are brought axially together.

This means that as a user brings the connector portions together, a simple pushing together of the connector portions can serve to cause the locking portion to move towards the first position.

The guiding means may be arranged to drive rotation of the locking portion towards the first position as the connector portions are brought axially together.

To put this another way, the guiding means may be arranged to translate axial movement of the first connector portion relative to the second connector portion into rotational movement of the locking portion relative to the engaging portion.

The guiding means may comprise at least one incline surface provided on one of the locking portion and the second connector portion for guiding the travel of a corresponding follower portion provided on the other of the locking portion and the second connector portion as the two connector portions are moved towards one another by a user.

Preferably, the second connector portion comprises the guiding means.

Preferably the locking portion comprises the follower portion.

The follower portion may comprise a projection, provided on say, the locking portion.

In a currently preferred set of embodiments, the locking portion comprises a first engaging element and the engaging portion comprises a second engaging element, the first engaging element engaging with the second engaging element when the locking portion and the engaging portion are in the first position with engagement between the first and second engaging elements holding the first and second connector portions against axial separation.

The guiding means may be arranged for guiding the first engaging element towards engagement with the second engaging element.

The first engaging element may comprise the follower portion.

The locking portion and engaging portion may be arranged to provide an initial engagement between the first and second connector portions when the locking portion is in an intermediate position between the first position and the second position.

The intermediate position may be such that when the locking portion is in the intermediate position, the first and second connector portions are held against axial separation. This may be due to interaction between the first engaging element and the second engaging element.

In such a case the first position may differ from the intermediate position in that the locking portion is held against rotation out of the first position by the interaction of a detent and a camming surface, whereas the locking portion is not so held in the intermediate position.

The guiding means may be arranged for guiding the locking portion to the intermediate position. Note that this is still a guiding towards the first position, but not necessarily all of the way to the first position.

Where the locking portion comprises a locking collar comprising at least one projecting portion which is arranged to act as the detent, the at least one projecting portion may also comprise the follower portion and/or the first engaging element.

Preferably the at least one projecting portion also comprises and/or acts as the follower portion and the first engaging element.

The at least one incline surface may be arranged transversely to, or at least in some senses orthogonally to, the camming surfaces where both are provided. Thus, for example, the camming surfaces may affect movement in a generally radial direction and the at least incline surface may affect movement in a generally axial direction.

In one set of embodiments the connector arrangement comprises a quick-connect connection mechanism for connecting the first and second connector portions, wherein
the second connector portion comprises a male part of the quick-connect connection system and the first connector portion comprises a female part of the quick-connect connection system, the female part comprising a plurality of engaging fingers arranged to move resiliently between an extended position for capturing the male part and a retracted position allowing insertion and removal of the male part in a receiving bore in the female part, and the female part further comprising a release mechanism for retracting the engaging fingers for removal of the male part, and
the second connector portion comprises a release mechanism operating portion for operating the release mechanism as the locking portion is moved from the first position towards the second position by a user.

This can provide an arrangement where action by the user to unlock the twist-lock connection between the first and second connector portions also serves to release the connecting effect of a quick-connect connection system when this is also present. Note also that this arrangement can also still facilitate backwards compatibility with standard quick-connect connectors. That is the first connector portion of such an embodiment may be arranged so as to still be connectable to a standard male quick-connect connector and/or the second connector portion of such an embodiment may be arranged so as to still be connectable to a standard female quick-connect connector.

What this arrangement reduces in terms of protection against accidental disconnection may be considered made up for in terms of ease of use for the user.

The release mechanism may be arranged to be operated by an axial retraction of a sleeve portion of the connecting portion away from a male portion insertion end of the connecting portion. The release mechanism operating portion may be arranged for driving retraction of the sleeve portion.

The locking portion may be carried on the sleeve portion and the release mechanism operating portion may be arranged for acting on the sleeve via the locking portion.

The release mechanism operating portion may be arranged for acting on the locking portion via at least one projecting portion provided on the locking portion.

Where the locking portion comprises a locking collar comprising at least one projecting portion which is arranged to act as the detent, the at least one projecting portion may also comprise the follower portion and/or the first engaging element and/or be arranged to be acted on by the release mechanism operating portion.

The release mechanism operating portion may comprise at least one incline surface (or ramp) for driving retracting movement of the sleeve as the locking portion is moved from the first position towards the second position by a user.

A incline surface of the at least one incline surface provided as part of the release mechanism operating portion may also act as a incline surface of the at least one incline surface of the guiding means.

Thus at least a portion of the guiding means may also function as the release mechanism operating portion.

The first body portion may comprise one of a hose connection portion for receiving an end of a garden hose and a garden product joining portion via which the first body portion is joined to or connectable to a garden product.

The second body portion may comprise one of a hose connection portion for receiving an end of a garden hose and a garden product joining portion via which the second body portion is joined to or connectable to a garden product.

The hose connection portion may comprise a spigot which is arranged to receive the end of a length of hose and a clamping arrangement comprising a plurality of deformable claws which surround the spigot and are arranged to be driven into contact with hose carried on the spigot under action of a locking nut such that a carried hose is clampable between the claws and the spigot.

The garden product might, for example, be one of: a garden tap, a hose gun, a hose nozzle, a hose reel, a watering lance, a controllable valve (such as a water computer), or so on.

One of the first and second connector portions may be a tap connector in which the respective body portion comprises a tap mounting portion via which the tap connector is mountable on a garden tap.

One of the first and second connector portions may be a hose fitting in which the respective body portion comprises hose connector portion for receiving an end of a garden hose.

One of the first body portion and the second body portion may comprise a male connector portion and the other of the first body portion and the second body portion may comprise a female connector portion arranged for receiving the male connector portion.

The first body portion may have a bore which defines part of the fluid flow path through the connector arrangement.

The second body portion may have a bore which defines part of the fluid flow path through the connector arrangement.

One of the first body portion and the second body portion may carry a seal for sealing against the other of the first body portion and the second body portion. This can help provide a sealed fluid flow path between the first body portion and the second body portion.

The first connector portion may be arranged to be backwards compatible with one of a male and a female industry standard quick connect hose fitting.

The second connector portion may be arranged to be backwards compatible with one of a male and a female industry standard quick connect hose fitting.

Typically, in such a case the respective first or second connector portion will fit with the corresponding quick connect fitting but without providing the locking function of the present system.

According to a second aspect of the present invention, there is provided, a first garden fluid flow connector portion for use in a garden fluid flow connector arrangement comprising the first connector portion and a second connector portion which is arranged to inter-engage with the first connector portion to form a fluid path through the connector arrangement, wherein the first connector portion comprises a first body portion and a locking portion mounted on the first body portion for rotation about an axis of the first body portion and for interaction with a engaging portion of the second connector portion for holding the first connector portion and a second connector portion together against axial separation.

According to a third aspect of the present invention, there is provided, a second garden fluid flow connector portion for use in a garden fluid flow connector arrangement comprising a first connector portion and the second connector portion which is arranged to inter-engage with the first connector portion to form a fluid path through the connector arrangement, wherein the second connector portion comprises a second body portion carrying an engaging portion arranged for interaction with a locking portion of the first connector portion for holding the first connector portion and a second connector portion together against axial separation.

According to a fourth aspect of the present invention, there is provided, a first garden fluid flow connector portion for use in a garden fluid flow connector arrangement as defined above wherein the first connector portion comprises a first body portion and a locking portion mounted on the first body portion for rotation about an axis of the first body portion and the locking portion is arranged for interaction with the engaging portion of a second connector portion.

According to a fifth aspect of the present invention, there is provided, a second garden fluid flow connector portion for use in a garden fluid flow connector arrangement as defined above wherein the second connector portion comprises a second body portion carrying an engaging portion arranged for interaction with the locking portion of first second connector portion.

According to a sixth aspect of the present invention there is provided a garden fluid flow connector combination comprising a first or second connector portion as defined in one of the second to fifth aspects of the invention connected to a corresponding quick connect garden fitting.

As will be understood, this is a combination of one of the parts of the connector arrangement of the present application, fitted to the corresponding other part of an industry standard system. Say a male connector portion of the present application, fitted to a female quick connect fitting or vice versa.

The garden fluid flow connector arrangement may be a garden hose fitting connector arrangement.

One of the first and second connector portions may be a garden hose fitting. One of the first and second connector portions may be a garden tap connector.

One of the first and second connector portions may be a garden product connector portion arranged for connection with a garden hose fitting.

According to another aspect of the present invention there is provided a garden hose fitting comprising:
 a body portion comprising a hose connector portion for accepting the end of a garden hose and a connector receiving portion for accepting a male connector portion of a component to be connected to the hose fitting; and
 a locking portion mounted on the body portion for rotation about an axis of the body portion and for interaction with an engaging portion of the component to be connected to the hose fitting for holding the hose fitting and the male connector portion together against axial separation.

According to another aspect of the present invention there is provided a garden hose fitting comprising:
 a body portion comprising a hose connector portion for accepting the end of a garden hose and a connector receiving portion for accepting a male connector portion of a component to be connected to the hose fitting; and
 a locking portion mounted on the body portion for rotation about an axis of the body portion and for interaction with an engaging portion of the component to be connected to the hose fitting.

According to another aspect of the present invention there is provided a garden hose fitting comprising:
 a body portion comprising a hose connector portion for accepting the end of a garden hose and a connector receiving portion for accepting a male connector portion of a component to be connected to the hose fitting; and
 a locking portion mounted on the body portion for rotation about an axis of the body portion and for interaction with a engaging portion of the component to be connected to the hose fitting, the locking portion comprising at least one projection which is arranged to interact with an engaging portion of the component to be connected to the hose fitting.

According to another aspect of the present invention there is provided a garden hose fitting comprising:
 a body portion comprising a hose connector portion for accepting the end of a garden hose and a connector receiving portion for accepting a male connector portion of a component to be connected to the hose fitting; and
 a locking portion mounted on the body portion for rotation about an axis of the body portion and for interaction with a engaging portion of the component to be connected to the hose fitting, the locking portion comprising at least one arm having a lip which is arranged to interact an engaging portion of the component to be connected to the hose fitting.

According to a further aspect of the present invention there is provided a garden hose fitting comprising:
 a body portion comprising a hose connector portion for accepting the end of a garden hose and a connector receiving portion for accepting a male connector portion of a component to be connected to the hose fitting; and a locking portion mounted on the body portion for rotation about an axis of the body portion and for interaction with an engaging portion of the component to be connected to the hose fitting, wherein the locking portion is rotatable relative to the first body portion and the engaging portion between a first position in which the hose fitting and male connector portion are engaged and held against axial separation by interaction of the locking portion and the engaging portion and a second position for allowing axial separation of the hose fitting and the male connector portion.

Note that, in general terms and with any necessary modifications in wording, all of the further features defined above following any aspect of the invention above are applicable as further features of all other aspects of the invention defined above. These further features are not restated after each aspect of the invention merely for the sake of brevity.

Embodiments of the present invention will now be described, by way of example only, with reference to the accompanying drawings in which:

FIGS. 1A and 1B schematically show a garden hose, a garden tap and a garden fluid flow connector arrangement, with FIG. 1A showing the hose disconnected from the tap and FIG. 1B showing the hose connected to the tap via the garden fluid flow connector arrangement;

Figure 2A:
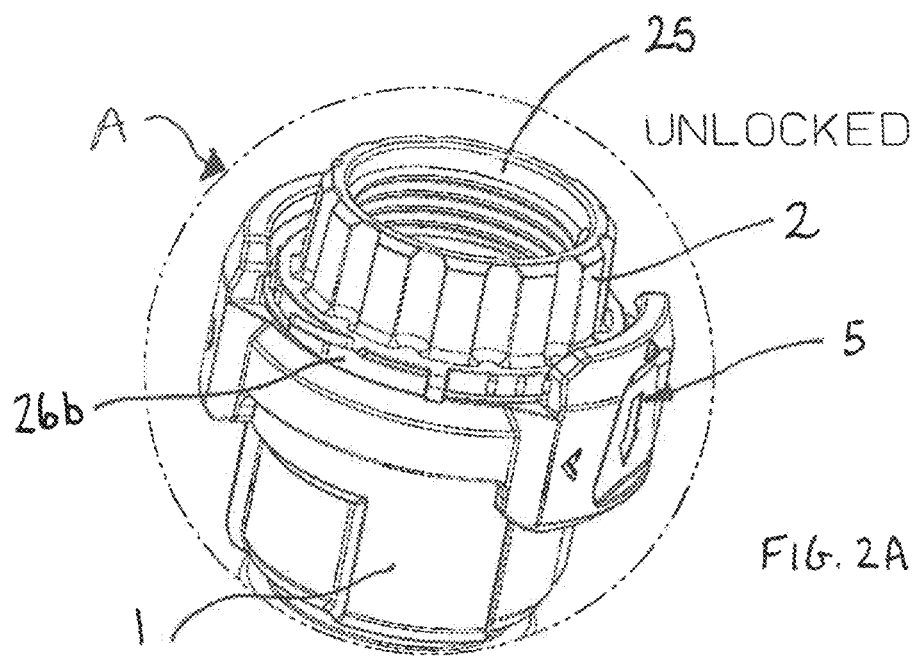
FIG. 2A is a partial view of the garden fluid flow connector arrangement of FIGS. 1A and 1B in an unlocked state.
Figure 2B:
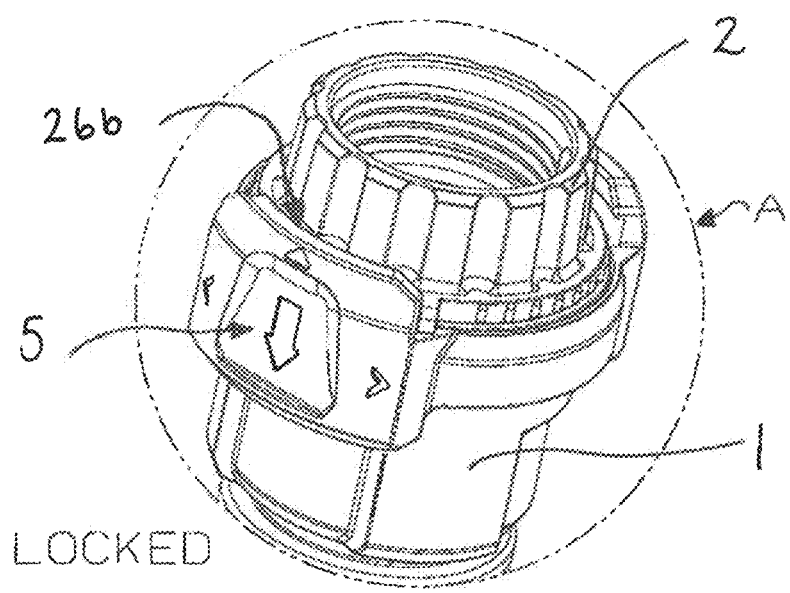
FIG. 2B is a partial view of the garden fluid flow connector arrangement of FIGS. 1A and 1B in an locked state.
Figure 3:
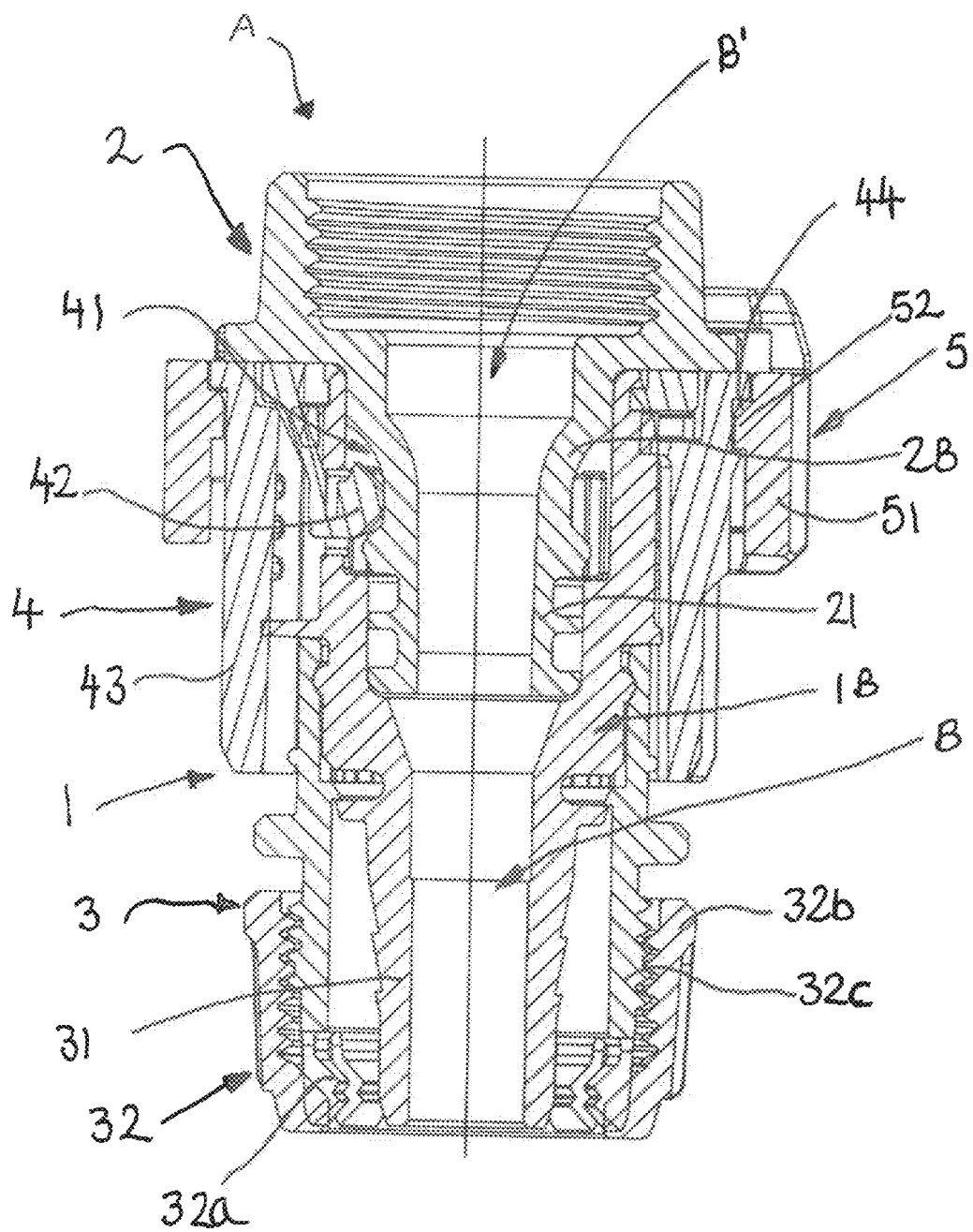
FIG. 3 is sectional view of the garden fluid flow connector arrangement shown in FIGS. 1A to 2B.
Figure 4A:
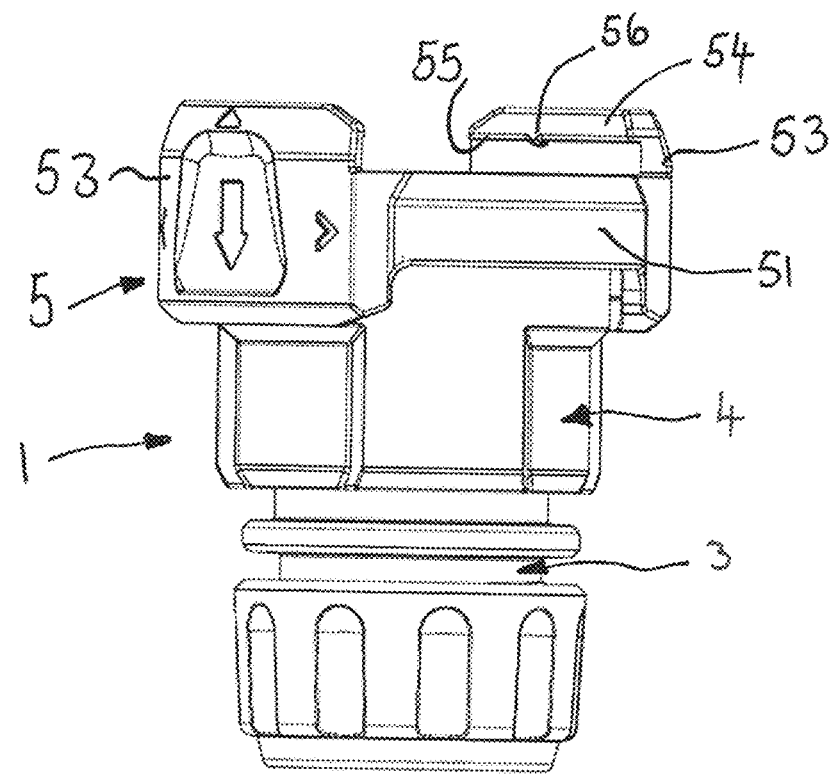
Figure 4B:
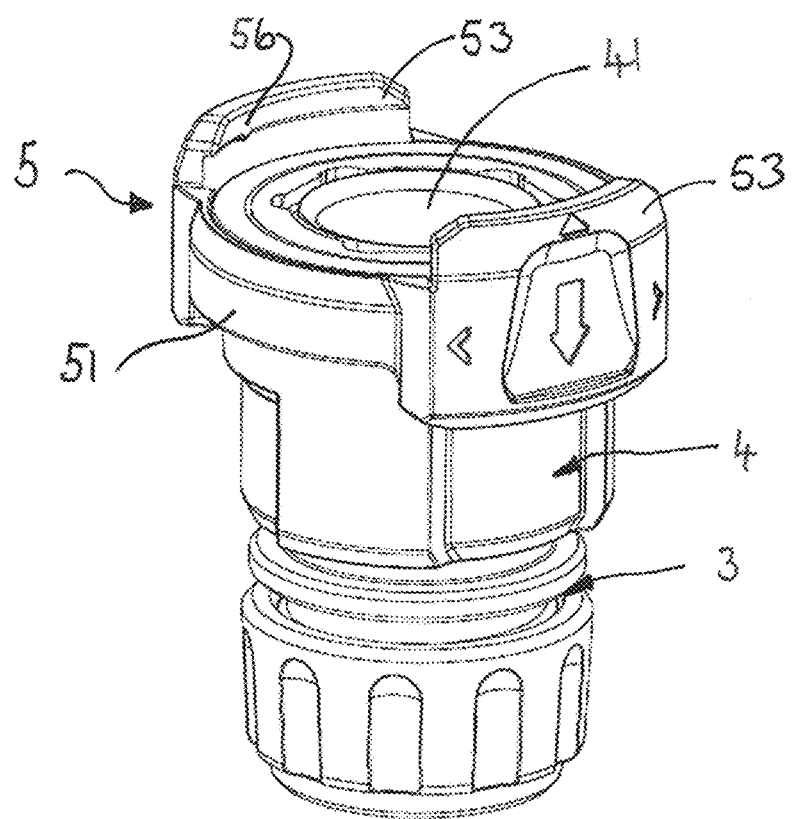
Figure 5B:
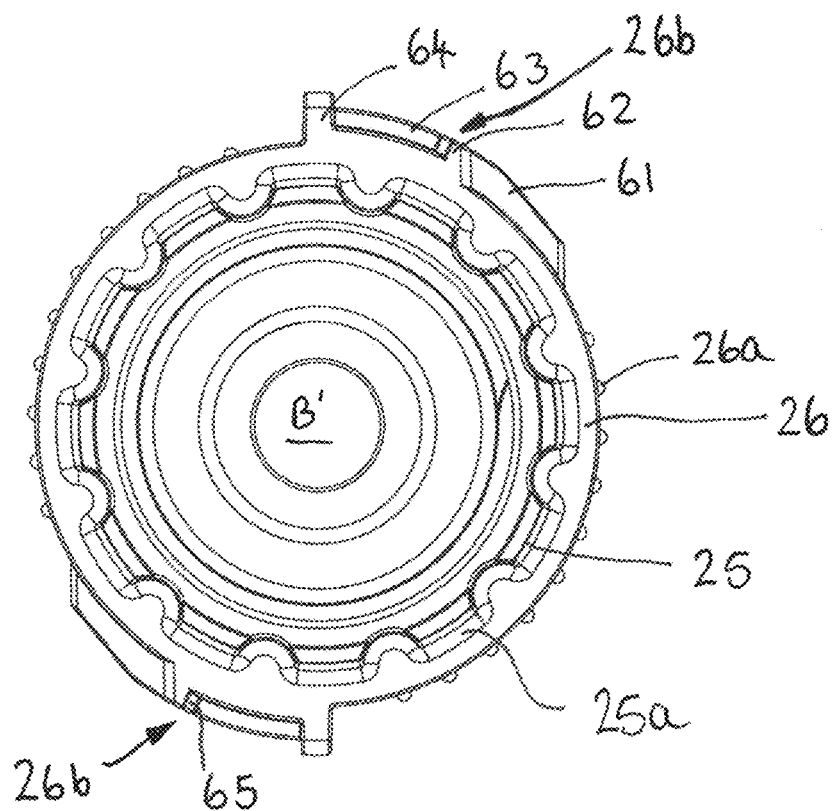
Figure 5A:
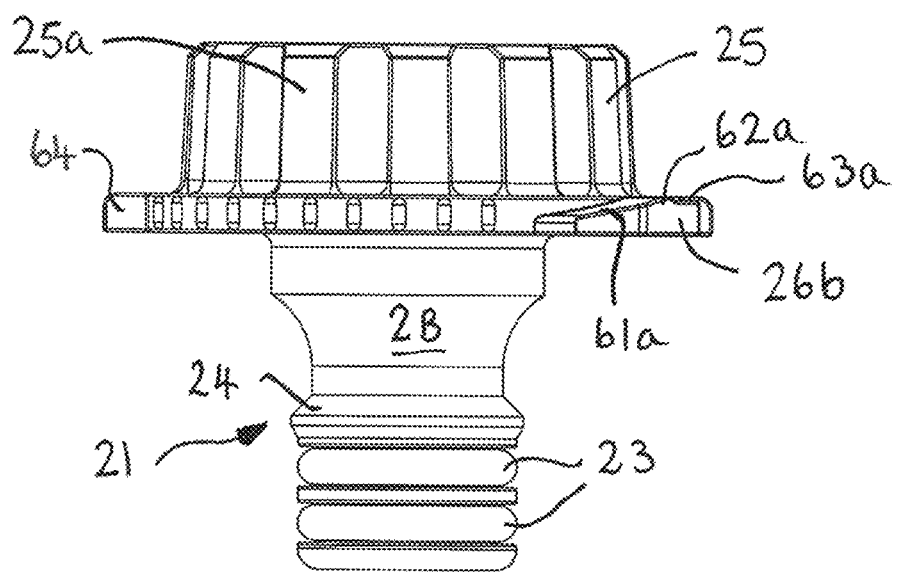
Figure 5C:
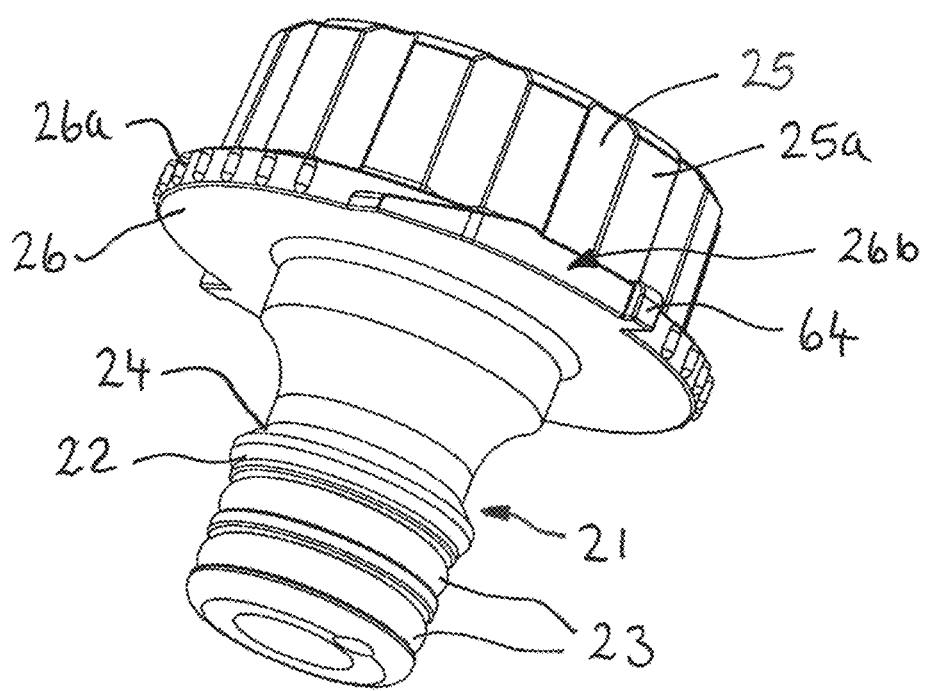
Figure 6A:
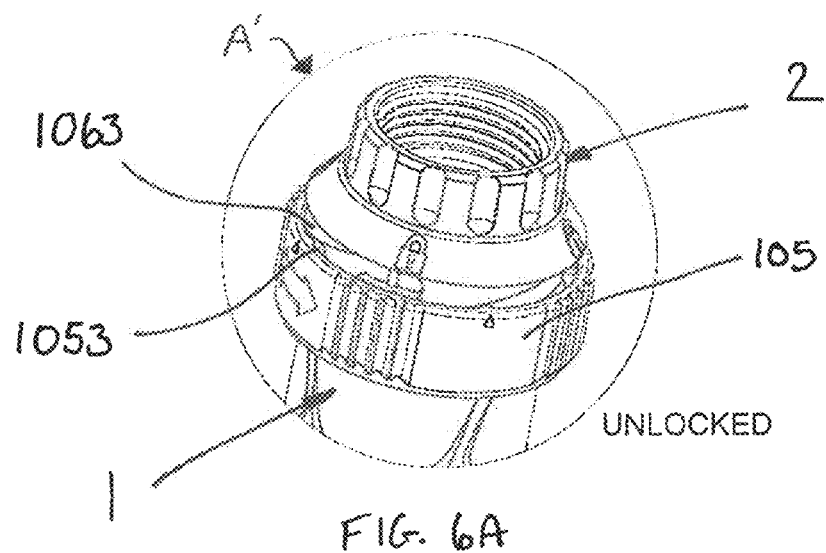
Figure 6B:
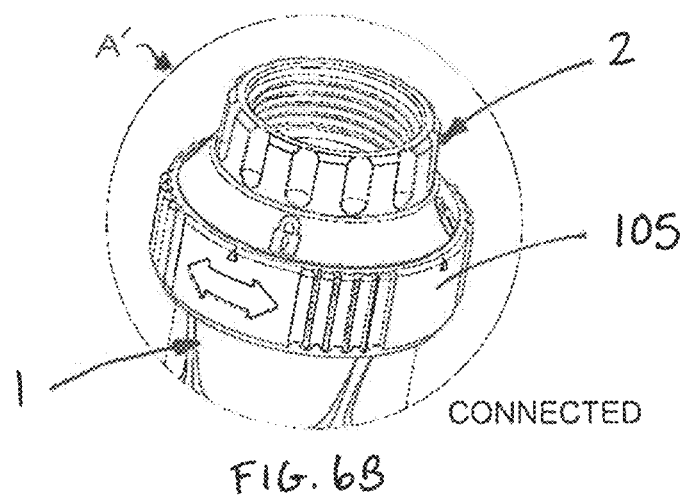
Figure 6C:
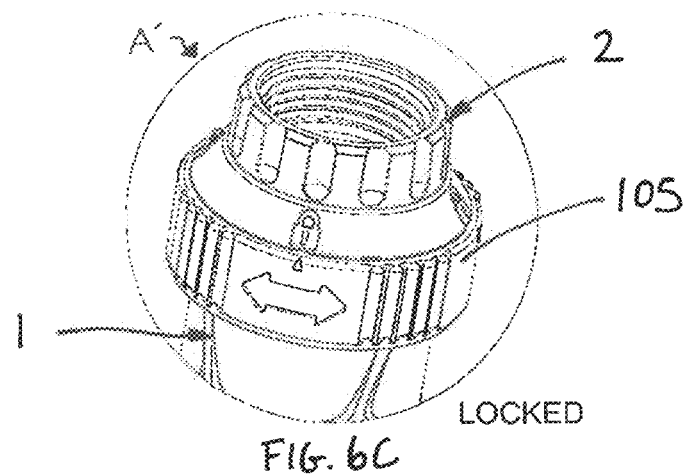
Figure 7:
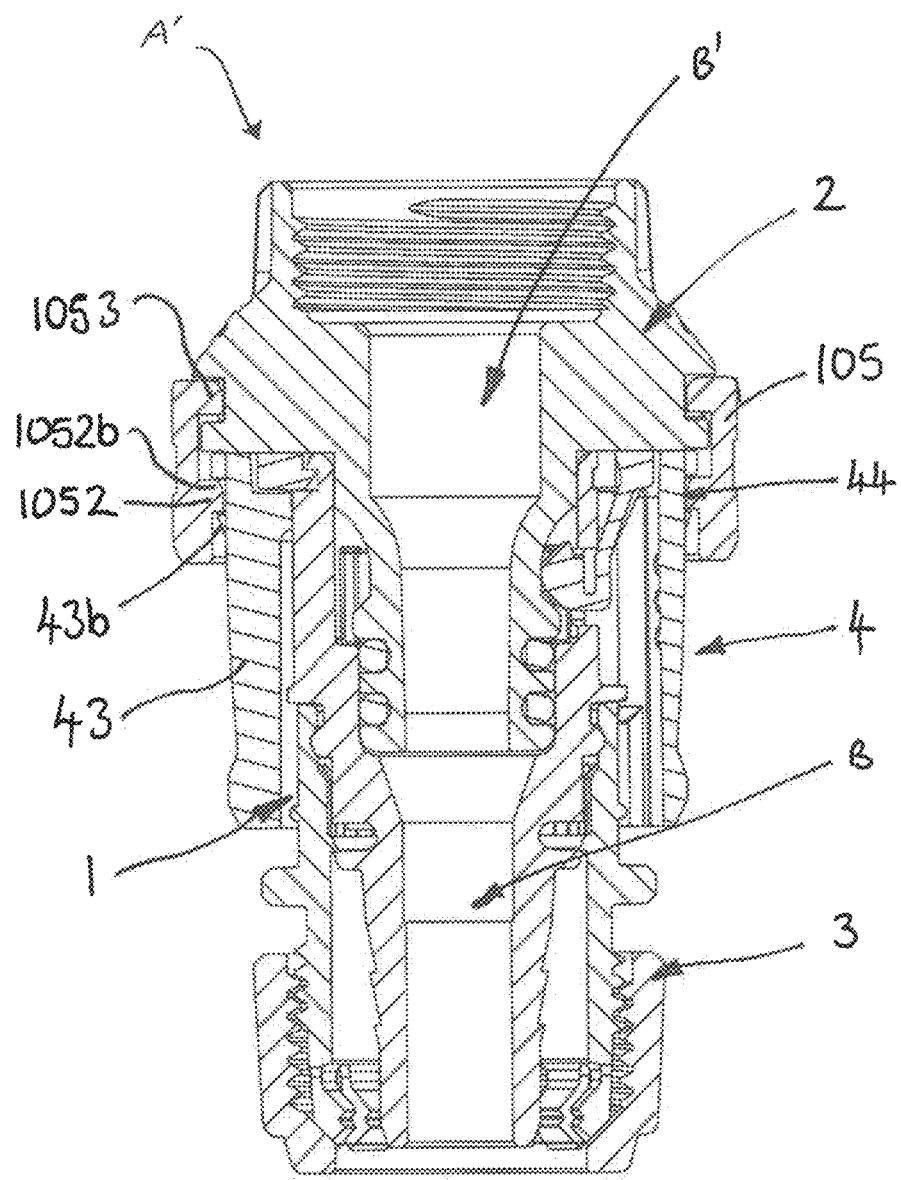
Figure 8:
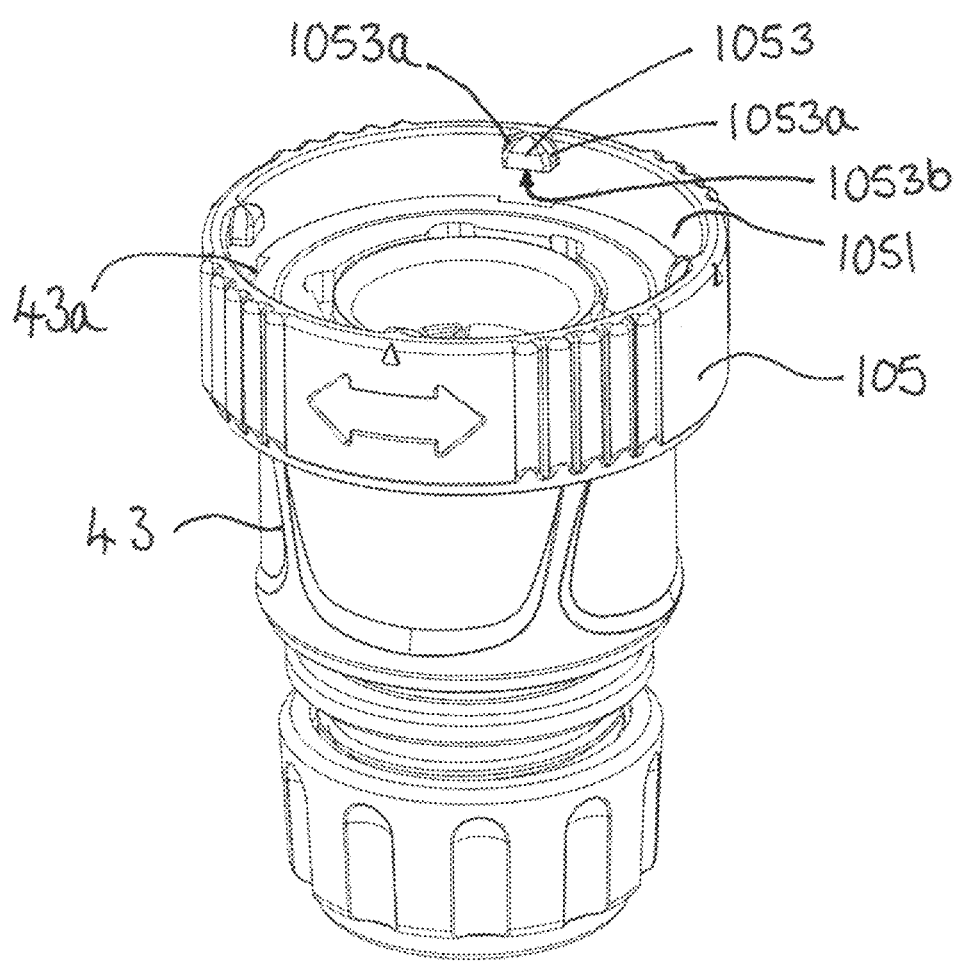
Figure 9:
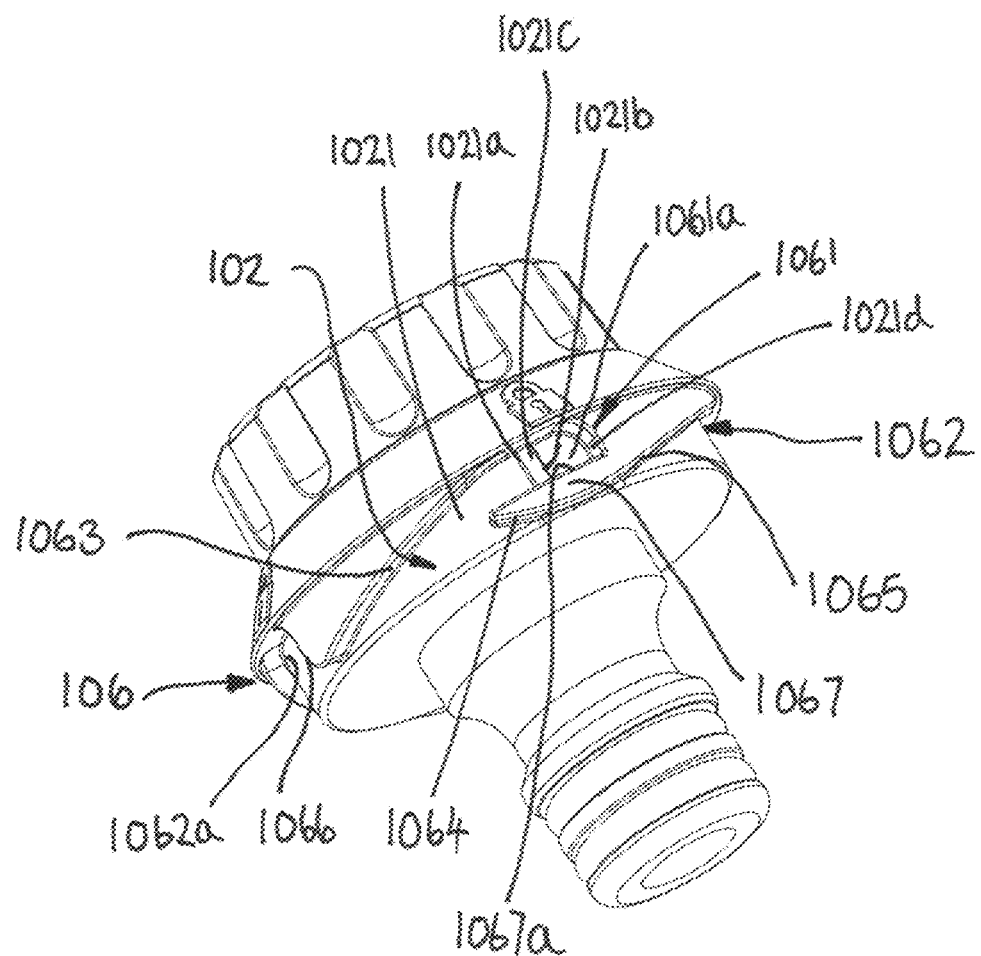

FIGS. 4A and 4B schematically show, in isolation, a first connector portion of the garden fluid flow connector arrangement shown in FIGS. 1A to 3;

FIGS. 5A to 5C schematically show, in isolation, a second connector portion of the garden fluid flow connector arrangement shown in FIGS. 1A to 3;

FIG. 6A is a partial view of an alternative garden fluid flow connector arrangement in an unlocked state;

FIG. 6B is a partial view of the alternative garden fluid flow connector arrangement of FIG. 6A in a connected state;

FIG. 6C is a partial view of the alternative garden fluid flow connector arrangement of FIG. 6A in a locked state;

FIG. 7 is sectional view of the alternative garden fluid flow connector arrangement shown in FIGS. 6A to 6C;

FIG. 8 schematically shows, in isolation, a first connector portion of the alternative garden fluid flow connector arrangement shown in FIGS. 6A to 7C; and FIG. 9 schematically shows, in isolation, a second connector portion of the alternative garden fluid flow connector arrangement shown in FIGS. 6A to 7.

Figure 1A:
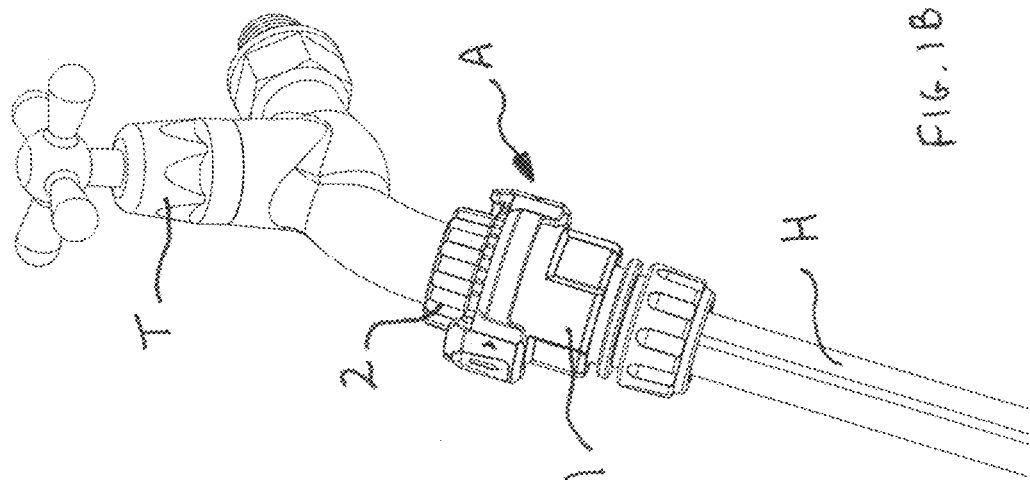
Figure 1B:
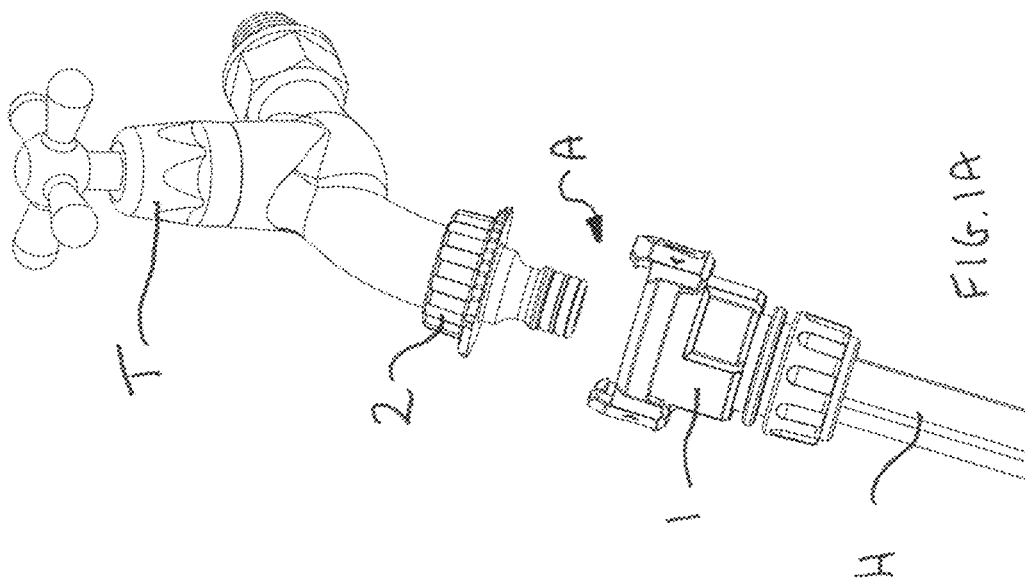

FIGS. 1A and 1B show a garden fluid flow connector arrangement A which comprises a first connector portion 1 and a second connector portion 2. In the present embodiment the first connector portion 1 is in the form of a hose fitting and the second connector portion 2 is in the form of a tap connector. It will be noted however, that the first and second connector portions 1 and 2 may also take other forms when embodying the present invention.

The hose fitting 1 is arranged to be mounted on an end of a length of hose, and is shown in FIGS. 1A and 1B mounted on a hose H. The tap connector 2 is arranged to be mounted on a garden tap and is shown in FIGS. 1A and 1B mounted on a tap T.

In FIG. 1B the hose H is shown connected to the tap T by the first and second portions 1, 2 of the garden fluid flow connector arrangement A (ie by the hose fitting 1 and the tap connector 2). In this state the garden fluid flow connector arrangement A puts the outlet of the tap T in fluid communication with the interior of the hose H, so that water may be fed into the hose H. There is a fluid flow path through the connector arrangement A.

In FIG. 1A the hose H is shown disconnected from the tap T, by virtue of the first and second connector portions 1, 2 being disconnected, or axially separated, from one another.

The garden fluid flow connector arrangement, as will be explained in more detail below with reference to the remaining drawings, comprises a conventional connection system and a "twist-lock" arrangement for guarding against unintentional disconnection of the first and second connector portions 1, 2.

FIG. 2A shows part of the garden fluid flow connector arrangement A in an unlocked state and FIG. 2B shows part the garden fluid flow connector arrangement A in a locked state. FIG. 3 is a sectional view of the garden fluid flow connector arrangement A in a locked state.

On the other hand for clarity, the first connector portion 1 is shown in isolation in FIGS. 4A and 4B, and the second connector portion 2 is shown in isolation in FIGS. 5A to 5C.

Referring to primarily to FIGS. 3, 4A and 4B, and also FIGS. 2A, and 2B, the hose fitting which is the first connector portion 1 comprises a main body 1B which comprises a hose connection portion 3 and a connector receiving portion 4. The first connector portion 1 further comprises a locking collar 5 which is mounted for rotation on the main body 1B about an axis of the main body 1B. The main body 1B has a main bore B through which fluid can flow when the first connector portion 1 is connected to a second connector portion 2 and in use.

The hose connection portion 3 comprises a spigot 31 which is arranged to receive the end of a length of hose and a clamping arrangement 32 comprising a plurality of deformable claws 32a which surround the spigot 31 and are arranged to be driven into contact with a hose end carried on the spigot 31 under action of a locking nut 32b such that a carried hose is clampable between the claws 32a and the spigot 31 as the locking nut 32b is screwed onto a threaded stem 32c on the hose connection portion. The hose H is shown in FIGS. 1A and 1B so mounted in the hose connection portion 3.

The connector receiving portion 4 is arranged for receiving a part of the second connector portion 2 when the first and second connector portions 1, 2 are connected together as shown for example in FIG. 1B.

In the present embodiment the first connector portion 1 is arranged as a female connector and the second connector portion 2 is arranged as a male connector.

In the present embodiment the first connector portion 1, specifically the connector receiving portion 4, comprises the female components of a quick connect type of connection system.

Correspondingly, as will be described in more detail below, the second connector portion 2 in the present embodiment comprises the male parts 21 (see FIGS. 3 and 5A) of a quick connect type of connection system.

It should be noted that in other embodiments of the present invention the first and second connector portions might not include such quick connect components.

Returning now to the connector receiving portion 4, this comprises a bore 41 for accepting the male parts 21 of the second connector portion. Provided in the region of this bore 41 are a plurality of engaging fingers 42 arranged to move resiliently between an extended position (as shown in FIG.

3) for extending into the bore 41 and capturing the second connector portion 2, and a retracted position allowing insertion and removal of second connector portion 2. As the second connector portion 2 is introduced into the connector receiving portion 4, the engaging fingers 42 are driven into the retracted position and return to the extended position once the two parts are fully engaged. A release mechanism in the form of a spring loaded sleeve 43 is provided for releasing the two parts. When the sleeve 43 is operated by pulling this away from the insertion end of the connector receiving portion 4, this retracts the engaging fingers 42 so that the male parts 21 of the second connector portion 2 are released and the second connector portion may be removed.

The hose connection portion 3 and connector receiving portion 4 of the first connector portion 1 are of a type that can be found in existing hose fittings. As mentioned in the introduction, where such a connection system is provided, then sometime there can unintentional disconnecting or separation of the connector portions 1, 2.

The locking collar 5 is provided with the aim of relieving this type of issue.

The locking collar 5 comprise a ring portion 51 which is mounted on the main body 1B of the first connector portion 1 so as to be able to rotate freely around the axis of the main body 1B, and in this case also around the axis of the bore 41 of the connector receiving portion 4. As can be seen in FIG. 3, the ring portion 51 has an internally projecting rib 52 that runs in a peripheral channel 44 provided in the connector receiving portion 4. This serves to hold the ring portion 51 in position axially on the first connector portion 1, whilst allowing rotation of the ring portion around the first connector portion 1.

The locking collar 5 comprises a pair of arms 53 that extend axially from the ring portion 51. Each arm 53 includes, and in the present embodiments, terminates in lip portion 54. Each lip portion 54 extends radially inwards from the respective arm 53. This provides an overhang or shoulder 55. A projection arranged to act as a detent 56 is provided on the lip portion 54. In the present case this projects from the shoulder 55 back towards the main body B of the first connector portion 1.

Referring now to FIGS. 5A to 5C as well as FIG. 3, the second connector portion 2 has a main body 2B with a main bore B' and comprises an engaging portion 6 for interacting with the locking collar 5 as will be described in more detail further below. When in use the main bore B' provides a fluid flow path through the second connector portion 2.

The second connector portion 2 of the present embodiment also comprises the male parts 21 of the quick connect system as mentioned above. As such the second connector portion 2 comprises a connector spigot 22 which carries a seal—in this case two O-rings seals 23, and a retaining shoulder 24. When the male parts 21 are accepted in the connector receiving portion 4 of the second connector portion 2, the engaging fingers 42 act against this retaining shoulder 24, to hold the parts engaged. At the same time the seal, in the present case the two O-rings 23, seals against the wall of the bore 41 of the connector receiving portion 4 in the second connection portion. The use of two O-rings 23 gives additional security against leaks, especially as the O-rings 23 age.

As best seen in FIGS. 2A and 2B, the second connector portion 2 (a tap connector in this embodiment) comprises an internally threaded portion 25 for threaded engagement on a garden tap—as shown in FIGS. 1A and 1B.

The second connector portion 2 comprises flange 26. In the present embodiment this is provided at a location axially between the internally threaded portion 25 and the male parts 21. Ribs 26a are provided on a peripheral edge of the flange 26 part way around its extent. Ribs 25a are also provided on the external surface of the internally threaded portion 25. Both sets of ribs 25a, 26a are axially extending, in the present embodiment. Both of these sets of ribs 25a, 26a assist a user in gripping the tap connector 2 when mounting this on a tap.

The engaging portion 6 comprises two flange portions 26b of the flange 26. The flange portions 26b are provided at a peripheral edge of the flange 26.

Each flange portion 26b comprises a ramp portion 61, an apex portion 62, and a recess portion 63. One of the flange portions 26b is arranged for interacting with a first of the arms 53 on the locking collar 5, and the other of the flange portions 26b is arranged for interacting with a second of the arms 53 on the locking collar 5. Together in each flange portion 26b, the ramp portion 61, the apex portion 62 and the recess portion 63 acts as a camming surface over which the respective detent 56 of the locking collar 5 rides when moving the locking collar 5 between an unlocked position as shown in FIG. 2A and a locked position as shown in FIG. 2B.

The engaging portion 6 further comprises a stop portion 64 for stopping rotational movement of the locking collar 5 relative to the second connector portion 2 passed a desired point. The stop portion 64 abuts against an edge of the respective arm portion 53 when the stop position is reached. In the present embodiment the stop portion 64 extends further radially outwards than does the engaging portion 6 in the region of the ramp, apex and recess portions 61, 62, 63. In the present embodiment a stop portion 64 is provided at each flange portion 26b of the engaging portion 6.

In order to connect the first and second connector portions 1, 2, the male parts 21 of the second connector portion 2 are inserted into the connector receiving portion 4 of the first connector portion 1. At this point there is normal connection between connector portions 1, 2 as provided by the quick connect components.

In order to facilitate this connecting together of the connector portions 1, 2, the connector portions 1, 2 need to be offered up together with the locking collar 5 in an unlock position relative to the second connector portion 2, in particular with respect to the engagement portion 6.

In practice in the present invention, this means aligning the arms 53 away from the flange portions 26b as the connector portions 1, 2 are brought together.

Once the connector portions 1, 2 are connected, they may be locked together by twisting the locking collar 5 relative to the main body 1B of the first connector portion 1 and the engagement portion 6.

As this twisting is carried out, the detents 56 ride up the ramps 61, over the apexes 62 and into the recesses 63, in contact with the respective surfaces 61a, 62a, 63a. Then the detents 56 act against the surface 63a of the recess portion whilst the surfaces 62a of the apexes 62 act against the surface of the underside of the lip—ie the overhang 55, and this serves to resist axial separation of the connector portions 1, 2 and so guards against accidental disconnection. There is a positive abutment between the locking portion 5 and the engaging portion 6 that resists the axial separation.

When disconnection is desired the locking collar 5 is twisted in the opposite direction to unlock the connector portions 1, 2 with the detent 56 riding in the opposite direction over the camming surfaces.

There is a shoulder 65 where the recess portion 63 meets the apex portion 62 that serves to resist (to a modest degree)

unlocking of the connector portions 1, 2. Thus the locking collar 5 is latched into the first, or locking, position.

Further it can be noted that the movement of the locking collar 5 to move between locked and unlocked positions is transverse, ie perpendicular in this case, to the direction of movement of the connectors when connecting or disconnecting these. This movement is also transverse to the direction of movement of the spring loaded sleeve 43 required to release the quick connect fingers 42. These facts together and alone help to further guard against accidental disconnection of the connectors.

In the present embodiment the interaction between the locking collar 5 and the engaging portion 6 in fact resists movement of the spring loaded sleeve 43 in the release direction when the locking collar 5 is in the locked position. Since the collar 5 is mounted on the sleeve 43, when the locking collar 5 is in the locked position and its interaction with the engaging portion 6 holds it against axial movement, then axial movement of the sleeve 43, in particular in the release direction is also resisted. This further reduces the risk of accidental disconnection of the connectors 1, 2.

In alternatives a resilient element (not shown), say a flat ring may be included in the connector arrangement—say on the face of the flange 26 that faces the first connector portion 1—that aims to help keep the detent 56 pressed into the recess portion 63 when locked and the compression of which can aid locking and unlocking of the locking collar 5. However, the provision of such a resilient element is not necessary.

It will be noted that the main body B1 of the first connector portion 1 can spin relative to the locking collar 5 and hence also relative to the second connector portion 2. Thus whilst the locking collar 5 and engaging portion 6 are locked together axially and against rotation (until the shoulder 65 is overcome), this does not stop the connected components from rotating relative to one another. Thus in the situation shown in FIG. 1B, the hose H can freely rotate relative to the tap—this can help prevent twisting and/or kinking of the hose H.

It should be noted that if desired the engaging portion 6 might be made to be rotatable relative to the body B2 of the second connector portion 2. For example the flange 26 could be rotatable relative to the body B2 of the second connector portion 2.

Further the connector arrangement could be reversed with the male parts and/or engaging portion on the hose fitting and the female parts and/or locking ring on the tap connector.

Further the engaging portion 6 or locking ring 5 might be provided on other garden products/components—either might be provided on say a hose gun, a garden sprinkler, a watering lance, a water computer and so on.

That said, to fit with existing connection systems, it is probably preferable that the female parts are provided in a hose fitting and probably preferable that the rotatable locking portion is mounted on a hose fitting.

Note that there is nothing to say that a detent if provided need be on the locking portion nor that camming surfaces if provided need be provided on the engagement portion—these can be reversed. In this specification the expression locking portion is used in combination with the idea of rotation relative to its respective connector portion—ie what makes it a locking portion is that it can rotate relative to its connector portion-whereas the engaging portion may or may not be able to rotate relative to its connector portion. The precise features present on the locking portion and engaging portion are a matter of choice.

The present hose fitting 1 and present tap connector 2 may each be used with a more conventional corresponding tap connector (or other component) and a more conventional hose fitting respectively. That is parts that do not carry a locking portion or an engagement portion of the present type. In such a case there can still be connection between the components relying on the quick connect connection system, but just no additional twist-lock functionality. This makes the present connectors backwards compatible with existing connectors.

The present connectors might be described as garden hose connectors. Typically of course the fluid carried will be water. The connectors might be described as garden watering connectors.

The present connectors can provide an improved connection. There can be an advantage in using rotation to lock or capture the connectors together rather than translational movement or rather than just translational movement. The lock and unlock movement is thus orthogonal to the direction in which the connectors are moved for connection and disconnection, and orthogonal to force that might be generated by pull on the connected components, water pressure and so on.

As alluded to above the present connectors can be arranged to allow backwards compatibility, arranged to allow use of existing "quick-connect" connection as well as twist-lock connection, and can be arranged to allow say a connected hose and hose gun to rotate relative to one another at the connection to avoid twisting/kinking.

FIGS. 6A to 9 relate to an alternative garden fluid flow connector arrangement A' which is similar to the garden fluid flow connector arrangement A which is shown in FIGS. 1 to 5C. In the description below the same reference numerals as were used above, are used to indicate those parts in the alternative garden fluid flow connector arrangement A' of FIGS. 6A to 9 which correspond to the same parts in the garden fluid flow connector arrangement A which is shown in FIGS. 1 to 5C.

The alternative garden fluid flow connector arrangement A' again comprises a first connector portion 1 and a second connector portion 2. Again in the present embodiment the first connector portion 1 is in the form of a hose fitting and the second connector portion 2 is in the form of a tap connector. As has been noted however, that the first and second connector portions 1 and 2 may also take other forms when embodying the present invention.

The alternative garden fluid flow connector arrangement again comprises a conventional connection system and a "twist-lock" arrangement for guarding against unintentional disconnection of the first and second connector portions 1, 2.

FIG. 6A shows part of the alternative garden fluid flow connector arrangement A' in an unlocked state, FIG. 6B shows part of the alternative garden fluid flow connector arrangement A' in a connected state and FIG. 6C shows part the alternative garden fluid flow connector arrangement A' in a locked state.

FIG. 7 is a sectional view of the alternative garden fluid flow connector arrangement A' in a locked state.

On the other hand for clarity, the first connector portion 1 of the alternative garden fluid flow connector arrangement A' is shown in isolation in FIG. 8, and the second connector portion 2 is shown in isolation in FIG. 9.

Referring to FIGS. 6A to 8, again the first connector portion 1 is provided in the form of a hose fitting which comprises a main body 1B which comprises a hose connection portion 3 and a connector receiving portion 4. The first connector portion 1 again further comprises a locking collar 105 which is mounted for rotation on the main body 1B about an axis of the main body 1B. The main body 1B has a main bore B through which fluid can flow when the first connector portion 1 is connected to a second connector portion 2 and in use.

The hose connection portion 3 in the alternative garden fluid flow connector arrangement A' is the same as the hose connection portion 3 of the garden fluid flow connector arrangement A of FIGS. 1 to 5C and hence detailed description of that is omitted.

The connector receiving portion 4 in the alternative garden fluid flow connector arrangement A' is in most respects the same as the connector receiving portion 4 of the garden fluid flow connector arrangement A of FIGS. 1 to 5C and hence detailed description of those parts in common is omitted. Those parts where there some differences will be described further below.

The locking collar 105 in the alternative garden fluid flow connector arrangement A' has some of the same function and operation as the locking collar 5 in the garden fluid flow connector arrangement A of FIGS. 1 to 5C, but it has a different arrangement. This will be described further below.

Referring to FIGS. 6A to 7 and 9, in the alternative garden fluid flow connector arrangement A', the second connector portion 2 is again provided as a tap connector.

The second connector portion 2 is in most respects the same as that of the garden fluid flow connector arrangement A of FIGS. 1 to 5C. It has a main body 2B with a main bore B', it includes the male parts 21 of the quick-connect system, is arranged to connect with the first connector portion and comprises an engaging portion 106 for interacting with the locking collar 105.

However the engaging portion 106 in the connector portion 2 of the alternative garden fluid flow connector arrangement A' is different than that of the garden fluid flow connector arrangement A of FIGS. 1 to 5C.

Below is a more detailed description of the locking collar 105 and engaging portion 106 of the alternative garden fluid flow connector arrangement A' and their interaction with one another.

Unlike the locking collar 5 of the garden fluid flow connector arrangement A of FIGS. 1 to 5C, the locking collar 105 of the alternative garden fluid flow connector arrangement A' does not comprise a pair of arms. Rather the locking collar 105 of the alternative garden fluid flow connector arrangement A' is arranged as an uninterrupted ring portion 1051. This might serve to make it less clear how the ring 1051 should be disposed to allow connection of the connectors, but the alternative connector arrangement A' includes features to mitigate against this as will be explained below.

As can be seen in FIG. 7, the ring portion 1051 again has an internally projecting rib 1052 that runs in a peripheral channel 44 provided in the connector receiving portion 4. This serves to hold the ring portion 1051 in position axially on the first connector portion 1, whilst allowing rotation of the ring portion 1051 around the first connector portion 1.

In the present arrangement the locking collar 1051 comprise at least one, in the present case four, projecting portions 1053. Each projecting portion 1053 projects inwardly from an internally facing circumferential side wall of the ring portion 1051. As will be explained in more detail below these projecting portions 1053 are arranged to interact with the engaging portion 106 of the second connector portion 2.

The engaging portion 106 comprises at least one locking region 1061 comprising a locking location 1061a for receiving a respective projection portion 1053 of the locking collar 1051 for holding the connector portions 1, 2 together. In the present embodiment there are two locking locations 1061a provided by the engaging portion 106. These are diametrically opposed to one another and one of these can be seen in FIG. 9. Midway between each of these locking locations 1061a are projection receiving regions 1062 each of which comprises a projection receiving recess 1062a—one of which can be seen in FIG. 9.

As mentioned above in the present arrangement there are four projecting portions 1053 on the locking collar 105. When the connector portions 1, 2 are locked together as shown in FIG. 6C, one pair of the projecting portions 1053 are received in respective locking locations 1061a, and one pair of the projecting portions 1053 are received in respective projection receiving recesses 1062a.

Each locking region 1061 comprises a first incline surface 1063 and a second incline surface 1064. The first and second incline surfaces 1063, 1064 are arranged around an outwardly facing circumferential side wall 102 of the second connector portion 2 and are inclined with respect to a plane normal to the axis of the second connector portion 2. This is inclination is such that a component following the inclined surface moves axially relative to the second connector portion 2.

The first incline surface 1063 leads towards the respective locking location 1061a. The second incline surface 1064 leads towards the first incline surface 1063.

Each projection receiving region 1062 comprises a third incline surface 1065 and a fourth incline surface 1066. The third and fourth cline surfaces 1065, 1066 are arranged around an outwardly facing circumferential side wall 102 of the second connector portion 2 and are inclined with respect to a plane normal to the axis of the second connector portion 2. This is inclination is again such that a component following the inclined surface moves axially relative to the second connector portion 2.

A portion of the outwardly facing circumferential side wall 102 of the second connector portion 2 acts as a camming surface 1021 and comprises a ramp portion 1021a and a shoulder portion 1021b with an apex portion 1021c disposed between the ramp portion 1021a and the shoulder portion 1021b. The locking location 1061a is disposed between the apex portion 1021c and a stop portion 1021d.

When the first connector portion 1 and second connector portion 2 are introduced together by a user, the projecting portions 1053 on the locking collar 5 will tend to meet and be guided by the incline surfaces 1063-1066. The incline surfaces 1063-1066 act as guiding means and the projecting portions 1053 act as following portions.

If a projecting portion 1053 lands on the first incline surface 1063 this will tend to guide the projecting portion 1053 towards the locking location 1061a. If a projecting portion 1053 lands on the second incline surface 1064 this will tend to guide the projecting portion 1053 towards the first incline surface 1063, from where it can be guided towards the locking location 1061a.

Projecting portions 1053 landing on the third and fourth incline surfaces 1065, 1066, may be correspondingly guided—although these incline surfaces could be omitted if chosen.

As can be seen in FIG. 8 the projecting portions 1053 have taper surfaces 1053a which surfaces follow along a respective incline surface 1063-1066 as the connector portions 1, 2 are brought together.

It will be recalled that the locking collar 105 is mounted for rotation relative to the remainder of the first connector portion 1. Thus as a user brings the connector portions 1, 2 axially towards one another for connecting the parts together, the interaction between the guiding portions and the following portions—ie between the incline surfaces 1063-1066 and the projecting portions 1053—will tend to cause rotation of the locking collar 105 relative to the main body 1B of the first connector portion 1 and also relative to the engaging portion 106 of the second connector portion 2. This in turn serves to lead the locking collar 105 towards a first position where the locking collar 105 interacts with the engaging portion 106 to hold the first and second connector portions against axial separation and, in this embodiment, where the locking collar 105 is locked against movement out of the first position by interaction of the projecting portion 1053 and the shoulder 1021b of the camming surface 1021. In this way the projecting portion 1053 acts as a detent for resisting movement of the locking collar 105 out of the first position—the locking collar 105 latches into the first position.

In the present embodiment the rotation described above takes the locking collar 105 through an intermediate position before the first position is reached. This intermediate position is one where the first and second connector portions 1, 2 are connected and so held against axial separation but the locking collar 105 has not fully reached its first, locked, position.

In should be noted that in other embodiments a position that corresponds to the present the intermediate position might represent the "first position" as defined in the appended claims.

Further as can be seen from a consideration of FIGS. 7 and 8, the locking collar 105 is arranged to be snap fittable on the remainder of the first connector portion 1 during assembly. As might be noted from FIG. 8, the projecting portions 1053 project radially inwards of the outermost diameter of the retractable sleeve 43. To facilitate snap fitting of the locking collar 105, corresponding recesses 43a are provided in the retractable sleeve 43 through which the projecting portions 1053 can pass during assembly. Further a leading edge 1052a of the rib 1052 provided on the locking collar 105 is chamfered and a correspondingly chamfered retaining ring portion 43b is provided on the retractable sleeve 43 so that in fitting the locking collar 105, the rib 1052 can be pushed over the chamfered retaining ring portion 43b into the retaining recess 44.

FIG. 6A shows the connector portions 1, 2 with the locking collar 105 in an unlocked position which corresponds to the "second position" as defined in the appended claims. In this state the connector portions can be moved axially apart and if the connector portions are moved axially further together, the projecting portions 1053 will tend to be guided by the incline surfaces 1063-1066 towards the first position at least until the intermediate position is reached.

Thus a user can achieve connection of the connector portions 1, 2 simply by pushing the connector portions together. This leads to an "automatic" movement of the locking collar 105 and at least initial locking against axial separation. If needed the user can make a final turn of the locking collar 105 to reach the first position. Thus connection is simplified and initial rotational lining up of the connectors is unnecessary.

If the connector portions 1, 2 are offered up in exactly the wrong relative rotational position, then the guiding may not work immediately, but some small relative wiggling of the connector portions 1, 2, which is likely to take place instinctively, will typically quickly resolve this issue.

FIG. 6B shows the connector portions 1, 2 with the locking collar 105 in the intermediate position. As mentioned above in this state the first and second connector portions 1, 2 are held against axial separation by the interaction of the locking collar 105 and the engaging portion 106 and so the state might be described as connected.

FIG. 6C shows the connector portions 1, 2 with the locking collar 105 in the locked position which in this embodiment is considered the "first position" as defined in the appended claims. As mentioned above, in this state the first and second connector portions 1, 2 are held against axial separation by the interaction of the locking collar 105 and the engaging portion 106, and the locking collar 105 is locked against movement out of the first position back towards the second position.

When the connector portions 1, 2 are connected and the locking collar 105 is in the state shown in FIG. 6B or 6C, the connector portions 1, 2 are held against axial separation as described above by interaction of engaging elements provided respectively on the locking collar 105 and the engaging portion 106. The projecting portion 1053 provides the engaging element on the locking collar 105 and has an engaging surface 1053b. The engaging element provided on the engaging portion 106 comprises a engaging projecting portion 1067 provided in the region of, and projecting away from, the camming surface 1021 and has an engaging surface 1067a. The engaging surfaces 1053b, 1067a abut one another when the connector portions 1, 2 are in the states shown in FIGS. 6B and 6C resisting axial separation of the connector portions 1, 2.

In the present embodiment, the incline surfaces 1063-1066 also act as release mechanism operating portions for operating the release mechanism of the quick-connect system provided in the first connector portion 1 when the locking collar 105 is moved away from the first position (or the intermediate position, in the present embodiment) towards the second position. In particular, the incline surfaces 1063-1066 serve to act on the spring loaded sleeve 43 via the projection portion 1053 and the locking collar 105 in general as the locking collar 105 is rotated by a user to disconnect the connector portions 1, 2 from one another.

This eases the process of disconnecting the connector portions without removing the benefits of better interconnection and reduced risk of accidental disconnection provided by the provision of the twist-lock arrangement.

It should be noted that in this connector arrangement A' rotation of the first body portion of the first connector portion 1 relative to the locking collar 105 and second connector portion 2 is again possible even when the locking collar 105 is engaged with the engaging portion 106 as those parts are held against relative rotation. So in this case too, there is reduced risk of twisting or tangling of a hose connected to the connector arrangement A'.

Further in this connector arrangement A' both the first connector portion 1 and the second connector portion 2 again can be, and are, backwards compatible with existing standard quick-connect connectors.

The invention claimed is:

1. A garden fluid flow connector arrangement comprising a first connector portion and a second connector portion which is arranged to inter-engage with the first connector portion to form a fluid path through the connector arrangement, wherein the first connector portion comprises a first body portion and a locking portion mounted on the first body portion for rotation about an axis of the first body portion and the second connector portion comprises a second body portion carrying an engaging portion and wherein the locking portion is rotatable relative to the first body portion and the engaging portion between a first position in which the first and second connector portions are engaged and held against axial separation by interaction of the locking portion and the engaging portion and a second position for allowing axial separation of the first and second connector portions, wherein, in addition to the locking portion and the engaging portion, the connector arrangement comprises a further, posh fit, connection mechanism for connecting the connector portions together.

2. A garden fluid flow connector arrangement according to claim 1 in which the locking portion and engaging portion are arranged to latch into the first position such that movement out of the first position towards the second position is resisted.

3. A garden fluid flow connector arrangement according to claim 1 in which one of the locking portion and the engaging portion comprises a detent and the other of the locking portion and the engaging portion comprises a camming surface over which the detent rides as the locking portion is moved into and out of the first position relative to the engaging portion.

4. A garden fluid flow connector arrangement according to claim 3 in which the camming surface has a shoulder portion against which the detent rides as the locking portion is moved out of the first position towards the second position.

5. A garden fluid flow connector arrangement according to claim 3 in which the camming surface comprises a ramp portion for guiding the detent as the locking portion is rotated towards the first position, an apex portion at an upper end of the ramp and a recess portion on an opposite side of the apex portion than is the ramp portion wherein the detent is disposed in the recess portion when the locking portion is in the first position.

6. A garden fluid flow connector arrangement according to claim 1 in which the locking portion and the engaging portion comprise respective stop portions which abut one another and resist further rotational movement of the locking portion relative to the engaging portion when the locking portion is moved fully into the first position.

7. A garden fluid flow connector arrangement according to claim 1 in which the rotatable mounting of the locking portion on the first body portion is such that the first body portion is freely rotatable relative to the locking portion when the locking portion is in the first position with the first and second connector portions engaged with one another.

8. A garden fluid flow connector arrangement according to claim 1 in which the locking portion is arranged as a locking collar.

9. A garden fluid flow connector arrangement according to claim 1 in which the locking portion comprises at least one of arm terminating in a lip which is arranged to interact the engaging portion to resist axial separation of the first and second connector portions.

10. A garden fluid flow connector arrangement according to claim 9 in which the locking portion comprises a pair of arms each terminating in a respective lip.

11. A garden fluid flow connector arrangement according to claim 1 in which the engaging portion comprises at least one flange portion which is arranged to interact with the locking portion to resist axial separation of the first and second connector portions.

12. A garden fluid flow connector arrangement according to claim 1 in which at least one of the second connector portion and the locking portion comprises guiding means for guiding the locking portion towards the first position as the connector portions are brought axially together.

13. A garden fluid flow connector arrangement according to claim 12 in which the guiding means comprises at least one incline surface provided on one of the locking portion and the second connector portion for guiding the travel of a corresponding follower portion provided on the other of the locking portion and the second connector portion as the two connector portions are moved towards one another by a user.

14. A garden fluid flow connector arrangement according to claim 1 in which one of the first and second connector portions is a tap connector in which the respective body portion comprises a tap mounting portion via which the tap connector is mountable on a garden tap.

15. A garden fluid flow connector arrangement according to claim 1 in which one of the first and second connector portions is a hose fitting in which the respective body portion comprises a hose connector portion for receiving an end of a garden hose.

16. A garden fluid flow connector arrangement according to claim 1 in which one of the first connector portion and the second connector portion is arranged to be backwards compatible with one of a male and a female industry-standard quick connect hose fitting.

17. A garden fluid flow connector arrangement according to claim 1 in which one of the first connector portion and the second connector portion comprises a male connector portion and the other of the first connector portion and the second connector portion comprises a female connector portion arranged for receiving the male connector portion, wherein the male connector portion carries two O-ring seals for sealing against a body portion of the female connector portion.

18. A first garden fluid flow connector portion for use in a garden fluid flow connector arrangement according to claim 1 wherein the first connector portion comprises a first body portion and a locking portion mounted on the first body portion for rotation about an axis of the first body portion and the locking portion is arranged for interaction with the engaging portion of the second connector portion.

19. A second garden fluid flow connector portion for use in a garden fluid flow connector arrangement according to claim 1 wherein the second connector portion comprises a second body portion carrying an engaging portion arranged for interaction with the locking portion of the first second connector portion.

20. A garden fluid flow connector arrangement as claimed in claim 1 wherein, said push fit connection mechanism comprising a quick-connect connection system having a male part which carries at least one O-ring seal and a female part which includes a bore arranged to accept the male part with the O-ring seal sealing against a wall of the bore and the female part further comprising a plurality of engaging fingers arranged to move resiliently between an extended position for capturing the male part and a retracted position allowing insertion and removal of the male part in the receiving bore.

21. A garden fluid flow connector arrangement comprising a first connector portion and a second connector portion which is arranged to inter-engage with the first connector portion to form a fluid path through the connector arrangement, wherein the first connector portion comprises a first body portion and a locking portion mounted on the first body portion for rotation about an axis of the first body portion and the second connector portion comprises a second body portion carrying an engaging portion and wherein the locking portion is rotatable relative to the first body portion and the engaging portion between a first position in which the first and second connector portions are engaged and held against axial separation by interaction of the locking portion and the engaging portion and a second position for allowing axial separation of the first and second connector portions, wherein the connector arrangement comprises a quick-connect connection mechanism for connecting the first and second connector portions, wherein the second connector portion comprises a male part of the quick-connect connection system and the first connector portion comprises a female part of the quick-connect connection system, the female part comprising a plurality of engaging fingers arranged to move resiliently between an extended position for capturing the male part and a retracted position allowing insertion and removal of the male part in a receiving bore in the female part, and the female part further comprising a release mechanism for retracting the engaging fingers for removal of the male part, and the second connector portion comprises a release mechanism operating portion for operating the release mechanism as the locking portion is moved from the first position towards the second position by a user.

22. A garden fluid flow connector arrangement according to claim 21 in which the release mechanism is arranged to be operated by an axial retraction of a sleeve portion of the connecting portion away from a male portion insertion end of the connecting portion and the release mechanism operating portion is arranged for driving retraction of the sleeve portion.

23. A garden fluid flow connector arrangement according to claim 22 in which the locking portion is carried on the sleeve portion and the release mechanism operating portion is arranged for acting on the sleeve via the locking portion.

* * * * *